US007852609B2

(12) United States Patent
Yang

(10) Patent No.: US 7,852,609 B2
(45) Date of Patent: Dec. 14, 2010

(54) ELECTRICAL POWER STRIP

(76) Inventor: Chen-Sheng Yang, No. 10, Lane 233, Lanchang Rd., Nanzih District, Kaohsiung (TW)

( * ) Notice: Subject to any disclaimer, the term of this patent is extended or adjusted under 35 U.S.C. 154(b) by 1098 days.

(21) Appl. No.: 11/546,324

(22) Filed: Oct. 12, 2006

(65) Prior Publication Data

US 2008/0088995 A1 Apr. 17, 2008

(51) Int. Cl.
*H02H 3/00* (2006.01)

(52) U.S. Cl. .......... 361/78

(58) Field of Classification Search .......... 361/62, 361/78, 91.5; 307/39

See application file for complete search history.

(56) References Cited

U.S. PATENT DOCUMENTS

| | | | | |
|---|---|---|---|---|
| 7,193,335 | B2 * | 3/2007 | Palmer et al. | 307/39 |
| 2003/0042796 | A1 * | 3/2003 | Siu | 307/39 |
| 2003/0179524 | A1 * | 9/2003 | Chou | 361/62 |
| 2004/0070275 | A1 * | 4/2004 | Niv | 307/39 |
| 2005/0007712 | A1 * | 1/2005 | Shim | 361/91.5 |
| 2005/0036258 | A1 * | 2/2005 | Ma et al. | 361/103 |
| 2005/0101193 | A1 * | 5/2005 | Godard | 439/652 |

* cited by examiner

*Primary Examiner*—Jared J Fureman
*Assistant Examiner*—Angela Brooks
(74) *Attorney, Agent, or Firm*—Muncy, Geissler Olds & Lowe, PLLC

(57) ABSTRACT

An electrical power strip has a base, a power cord and a control module. The base has at least one primary receptacle and at least one secondary receptacle. The control module is connected to the power cord and has two power input terminals, at least one primary contact set, a voltage regulating circuit, a current indicating circuit, a comparator, a driving circuit and at least one secondary contact set. The two power input terminals are connected to the power cord. The voltage regulating circuit is connected to the two power input terminals and outputs a regulated voltage. The current indicating circuit is connected to the primary contact set and the voltage regulating circuit to output direct current. The comparator checks for the regulated voltage and the direct current and then outputs a control signal. The control signal applies power to the secondary contact set.

12 Claims, 2 Drawing Sheets

ELECTRICAL POWER STRIP

BACKGROUND OF THE INVENTION

1. Field of the Invention

The present invention relates to an electrical power strip, and more particularly to an electrical power strip that synchronously turns devices plugged into the electrical power strip on and off.

2. Description of Related Art

Computers are often used with many peripherals such as monitors, speakers, printers or the like. Often the computers and the peripherals require individual sources of power and plug into receptacles in electrical outlets. Most of the time, not enough electrical outlets and receptacles are available to accommodate the computers and the peripherals. Therefore, extension cords with multiple receptacles or electrical power strips are required to provide an adequate number of receptacles.

Generally, an electrical power strip has a base, a power cord and at least one switch. The base has multiple receptacles. The power cord connects the multiple receptacles to an external power source. The switch is mounted on the base between the receptacles and the power cord to connect and disconnect the receptacles to and from electrical power. Conventional electrical power strips may have one or numerous switches. When the electrical power strip has one switch, the switch connects or disconnects all receptacles to or from power. When the electrical power strip has numerous switches, the switches correspond respectively to the receptacles, and each switch connects or disconnects one receptacle to or from power.

With such an electrical power strip, plugs of the computers and the peripherals are inserted respectively into the receptacles of the electrical power strip. However, after shutting down the computers, having to further shut the peripherals down individually is inconvenient.

To overcome the shortcomings, the present invention provides an electrical power strip to mitigate or obviate the aforementioned problems.

SUMMARY OF THE INVENTION

The main objective of the invention is to provide an electrical power strip that synchronously turns devices plugged into the electrical power strip on and off.

An electrical power strip in accordance with the present invention comprises a base, a power cord and a control module. The base comprises at least one primary receptacle and at least one secondary receptacle. The power cord is connected one side of the base and selectively connects to an external power source. The control module is mounted in the base, is connected to the power cord and comprises a first terminal, a second terminal, at least one primary contact set, a voltage regulating circuit, a current indicating circuit, a comparator, a driving circuit and at least one secondary contact set. The first and the second terminals are connected to the power cord to obtain power. The primary contact set corresponds to the primary receptacle. The voltage regulating circuit is connected to the power cord through the two terminals and outputs a regulated voltage. The current indicating circuit is connected to the second terminal, the primary contact set and the voltage regulating circuit to output direct current. The comparator is connected to the voltage regulating circuit and the current indicating circuit and outputs a control signal when the regulated voltage and the direct current are received simultaneously. The driving circuit is connected to the two terminals and the comparator. The secondary contact set corresponds to one secondary receptacle and receives power from the driving circuit when the comparator outputs a control signal.

Other objectives, advantages and novel features of the invention will become more apparent from the following detailed description when taken in conjunction with the accompanying drawings.

DETAILED DESCRIPTION OF PREFERRED EMBODIMENT

Figure 1:
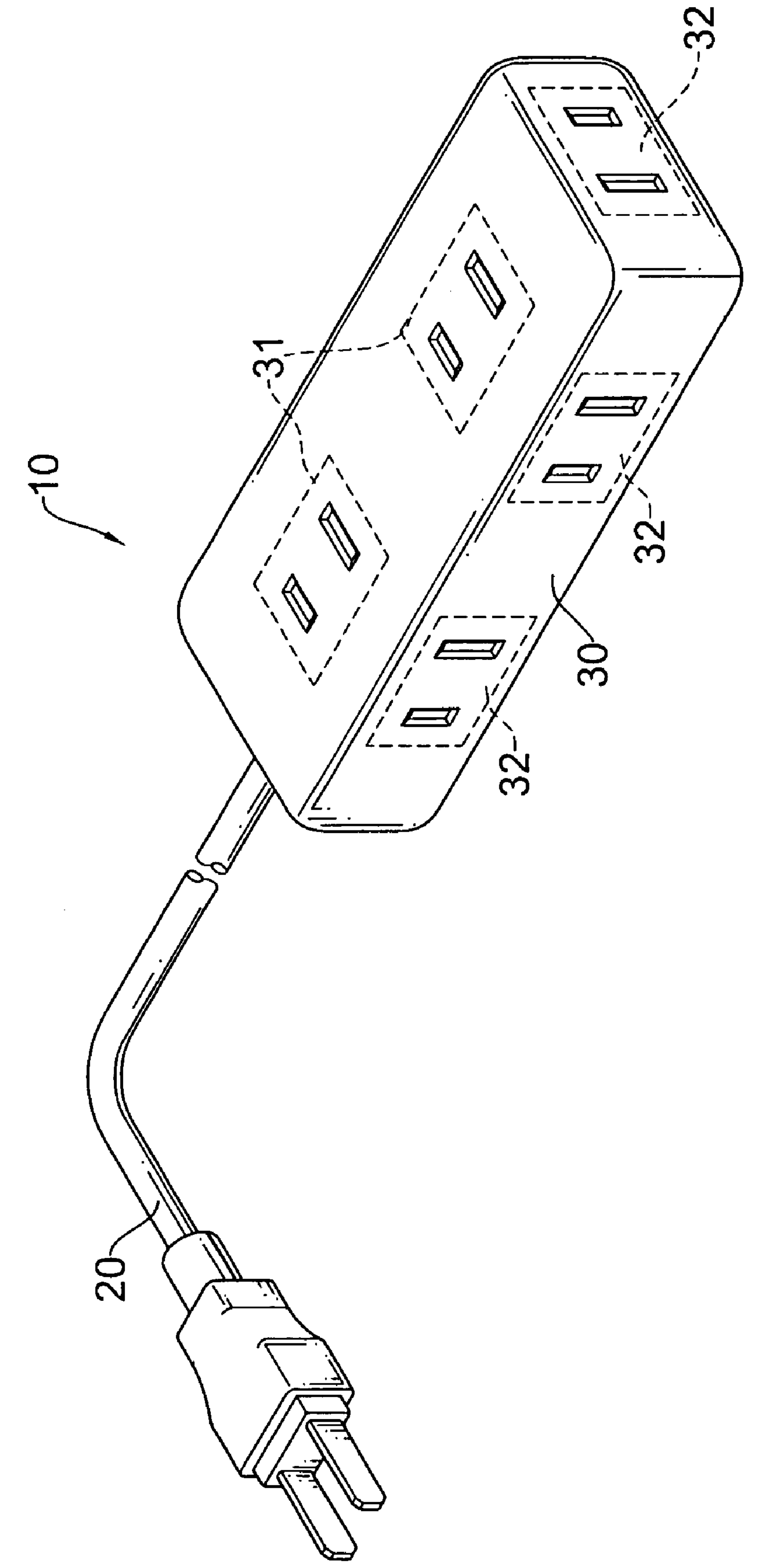
FIG. 1 is a perspective view of an electrical power strip in accordance with the present invention.
Figure 2:
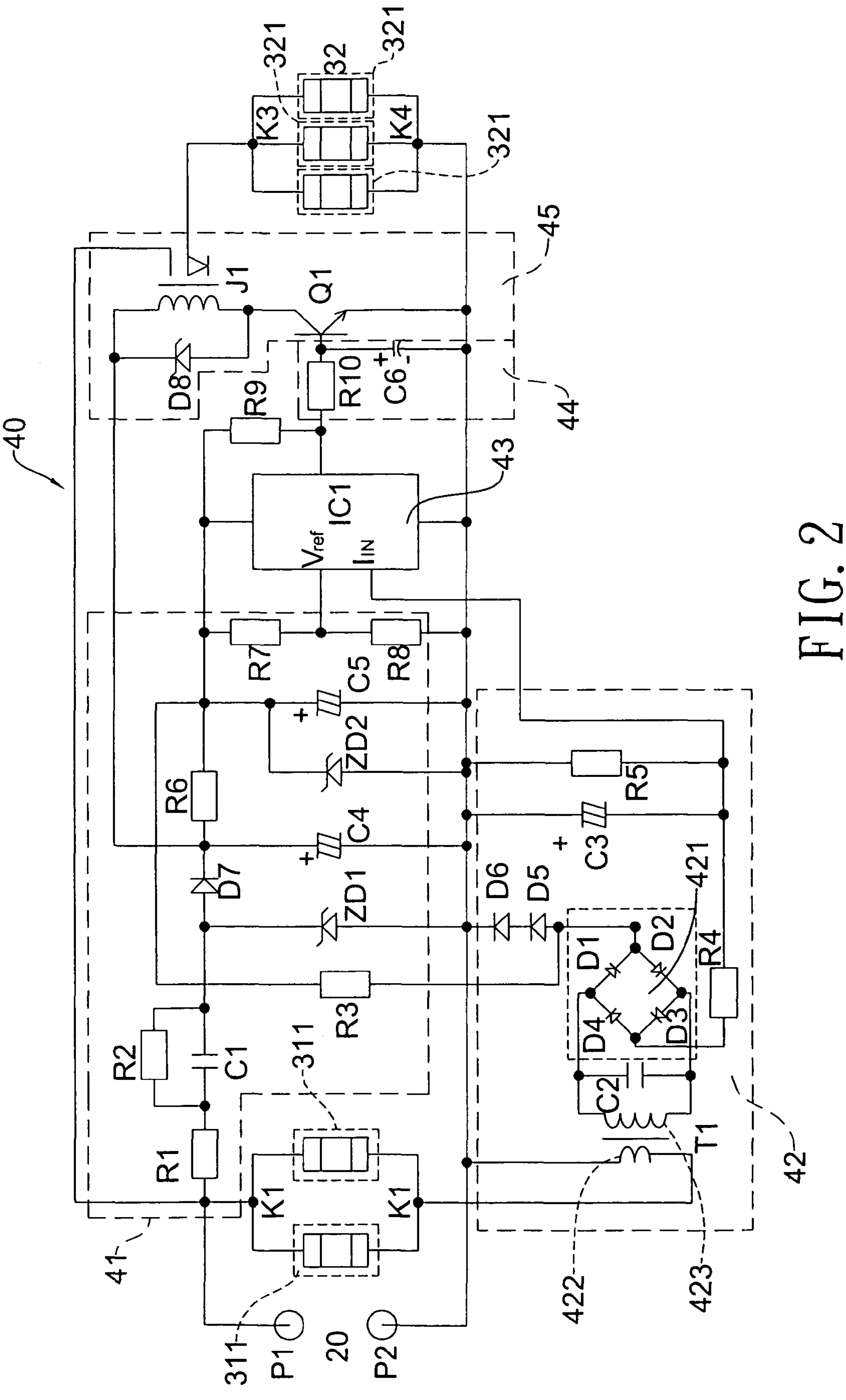
FIG. 2 is a circuit diagram of a control module in the electrical power strip in FIG. 1.

With reference to FIGS. 1 and 2, an electrical power strip (10) in accordance with the present invention comprises a base (30), a power cord (20) and a control module (40).

The base (30) may be a rectangular parallelepiped, has at least one side (not numbered) and comprises at least one primary receptacle (31) and at least one secondary receptacle (32).

The power cord (20) is connected one side of the base (30) and selectively connects to an external power source (not shown).

The control module (40) is mounted in the base (30), is connected to the power cord (20) and comprises a first power input terminal (P1), a second power input terminal (P2), at least one optional primary contact set (311), a voltage regulating circuit (41), a current indicating circuit (42), a comparator (43), an optional delay circuit (44), a driving circuit (45) and at least one optional secondary contact set (321).

The first and second power input terminals (P1, P2) are connected to the power cord (20) to obtain power from the external power source.

The primary contact sets (311) correspond and are connected respectively to the primary receptacles (31) and are connected in parallel to the first power input terminal (P1).

The voltage regulating circuit (41) is connected to the power cord (20) through the two power input terminals (P1, P2) to output a regulated voltage and may comprise multiple resistors (R1, R2, R3, R6, R7, R8), multiple capacitors (C1, C4, C5), a diode (D7) and two zenor diode (ZD1, ZD2). A first resistor (R1) is connected to the first power input terminal (P1). A second resistor (R2) and a first capacitor (C1) are connected in parallel and are further connected to the first resistor (R1). A first zenor diode (ZD1) and a diode (D7) are connected to the second resistor (R2) and the first capacitor (C1). A second capacitor (C4) and fourth resistor (R6) are connected to the diode (D7). A second zenor diode (ZD2), a third capacitor (C5), a third resistor (R3) and a fifth resistor (R7) are connected to the fourth resistor (R6). A sixth resistor (R8) is connected in series to the fifth resistor (R7).

The current indicating circuit (42) is connected to the second power input terminal (P2), the primary contacts sets (311) and the voltage regulating circuit (41) to output a direct current and may comprise a transformer (T1) and a rectifier (421).

The transformer (T1) is connected between the second power input terminal (P2) and the primary contact sets (311) and has a first coil (422) and a second coil (423). The first coil (422) is connected between the second power input terminal (P2) and the primary contact sets (311). The second coil (423) outputs a current induced from current passing through the first coil (422).

The rectifier (421) is connected to the voltage regulating circuit (41) and the second coil (423) to transform the induced current to direct current.

The comparator (43) may be an integrated circuit, may have a voltage input terminal ($V_{ref}$) and a current input terminal ($I_{IN}$) and has an output. The voltage input terminal ($V_{ref}$) is connected to the voltage regulating circuit (41). The current input terminal ($I_{IN}$) is connected to the current indicating circuit (42). The comparator (43) checks for the existence of the regulated voltage output by the voltage regulating circuit (41) and the direct current output by the rectifier (421) and, when both are present, outputs a control signal.

The voltage input terminal ($V_{ref}$) is connected between the fifth and sixth resistors (R7, R8) in the voltage regulating circuit (41) to obtain a regulated voltage.

The current input terminal ($I_{IN}$) is connected to the rectifier (421) in the current indicating circuit (42) to obtain direct current.

The delay circuit (44) may be composed of a seventh resistor (R10) and a fourth capacitor (C6) and is connected to the output of the comparator (43). The seventh resistor (R10) is connected to the output of the comparator (43). The fourth capacitor (C6) is connected between the second power input terminal (P2) and the seventh resistor (R10). The seventh resistor (R10) and the fourth capacitor (C6) create a delay to delay the control signal.

The driving circuit (45) is connected to the two power input terminals (P1, P2) and the delay circuit (44) and may comprise a third zenor diode (D8), a relay (J1) and a transistor (Q1).

The third zenor diode (D8) and the relay (J1) are connected in parallel and are connected to the first power input terminal (P1).

The transistor (Q1) has a base terminal, a collector terminal and an emitter terminal. The base terminal is connected to the output of the comparator (43) through the delay circuit (44). The collector terminal is connected to the first power input terminal (P1) through the third zenor diode (D8) and the relay (J1). The emitter terminal is connected to the second power input terminal (P2).

The secondary contact sets (321) correspond and are connected respectively to the secondary receptacles (32) in parallel and are connected to the relay (J1) in the driving circuit and the second power input terminal (P2).

When electronic plugs of a computer and a peripheral are plugs respectively into one primary receptacle (31) and one secondary receptacle (32) and the computer is turned on, the voltage regulating circuit (41) outputs a regulated voltage and the second coil (423) of the current indicating circuit (42) outputs an induced current. The regulated voltage is received by the voltage input terminal ($V_{ref}$) of the comparator (43). The induced current is transformed to a direct current by the rectifier (421) in the current indicating circuit (42). The current input terminal ($I_{IN}$) of the comparator (43) receives the direct current, and the comparator (43) senses the regulated voltage and the direct current. The comparator (43) outputs a control signal to the driving circuit (45). The control signal turns the transistor (Q1) on and then the relay (J1) works to let the power at the two power input terminals (P1, P2) go through to the secondary contact sets (321). Therefore any peripheral connected to a secondary contact set (321) obtains power.

When the computer is turned off and current stops flowing through the primary contact set (311), direct current stops flowing to the comparator (43) that turns off the control signal that turns off the relay (J1) and stops power from the power input terminals (P1, P2) from being applied to the secondary contact set (321). With such an electrical power strip, a computer and peripherals connected to the electrical power strip turn on or off synchronously.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. An electrical power strip comprising a base having at least one side and comprising at least one primary receptacle and at least one secondary receptacle;

a power cord connected one side of the base and selectively connecting to an external power source; and a control module being mounted in the base, being connected to the power cord and comprising a first power input terminal and a second power input terminal connected to the power cord to obtain power;

at least one primary contact set corresponding and being connected respectively to the primary receptacles and being connected in parallel to the first power input terminal;

a voltage regulating circuit being connected to the power cord through the two power input terminals to output a regulated voltage;

a current indicating circuit being connected to the second power input terminal, the primary contact set and the voltage regulating circuit to output direct current;

a comparator having an output, being connected to the voltage regulating circuit and the current indicating circuit to check for the existence of the regulated voltage and the direct current and when both are present, outputting a control signal;

a driving circuit being connected to the two power input terminals;

at least one secondary contact set corresponding and being connected respectively to the secondary receptacles in parallel and connected to the second power input terminal and the driving circuit;

a delay circuit connected between the output of the comparator and the driving circuit to delay the control signal.

2. The electrical power strip as claimed in claim 1, wherein the voltage regulating circuit comprises a first resistor connected to the first power input terminal;

a second resistor and a first capacitor connected in parallel and connected to the first resistor;

a first zenor diode and a diode connected to the second resistor and the first capacitor;

a second capacitor and a fourth resistor connected to the diode;

a second zenor diode, a third capacitor, a third resistor and a fifth resistor connected to the fourth resistor; and a sixth resistor connected in series to the fifth resistor.

3. The electrical power strip as claimed in claim 2, wherein the current indicating circuit comprises a transformer being connected between the second power input terminal and the primary contact set and having a first coil being connected between the second power input terminal and the primary contact set; and a second coil outputting an induced current from current passing through the first coil; and a rectifier being connected to the voltage regulating circuit and the second coil to transform the induced current to direct current.

4. The electrical power strip as claimed in claim 3, wherein the comparator further has a voltage input terminal connected between the fifth and sixth resistors in the voltage regulating circuit; and a current input terminal connected to the rectifier in the current indicating circuit

5. The electrical power strip as claimed in claim 4, wherein the comparator is an integrated circuit.

6. The electrical power strip as claimed in claim 1, wherein the current indicating circuit comprises a transformer being connected between the second power input terminal and the primary contact set and having a first coil being connected between the second power input terminal and the primary contact set; and a second coil outputting an induced current from current passing through the first coil; and a rectifier being connected to the voltage regulating circuit and the second coil to transform the induced current to direct current.

7. The electrical power strip as claimed in claim 1, wherein the comparator further has a voltage input terminal connected to the voltage regulating circuit; and a current input terminal connected to the current indicating circuit.

8. The electrical power strip as claimed in claim 7, wherein the comparator is an integrated circuit.

9. The electrical power strip as claimed in claim 1, wherein the driving circuit comprises a third zenor diode connected to the first power input terminal;

a relay connected in parallel to the zenor diode and connected to the first power input terminal; and a transistor having a base terminal connected to output of the comparator;

a collector terminal connected to the first power input terminal through the third zenor diode and the relay; and an emitter terminal connected to the second power input terminal; and the secondary contact set connected to the relay in the driving circuit.

10. The electrical power strip as claimed in claim 9, wherein the delay circuit comprises a seventh resistor connected to the output of the comparator; and a fourth capacitor connected between the second power input terminal and the seventh resistor, whereby the seventh resistor and the fourth capacitor create a delay to delay the control signal.

11. The electrical power strip as claimed in claim 1, wherein the control circuit further comprises a delay circuit connected between the output of the comparator and the driving circuit to delay the control signal; and the base terminal of the transistor in the driving circuit is connected to the output of the comparator through the delay circuit.

12. The electrical power strip as claimed in claim 11, wherein the delay circuit comprises a seventh resistor connected to the output of the comparator; and a fourth capacitor connected between the second power input terminal and the seventh resistor, whereby the seventh resistor and the fourth capacitor create a delay to delay the control signal.

* * * * *